(12) United States Patent
Oh

(10) Patent No.: US 6,931,414 B1
(45) Date of Patent: Aug. 16, 2005

(54) CREATING VISUAL DATA MODELS COMBINING MULTIPLE INTER-RELATED MODEL SEGMENTS

(75) Inventor: Chang-Ho Oh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/507,064

(22) Filed: Feb. 18, 2000

(51) Int. Cl.[7] .............................................. G06F 17/30
(52) U.S. Cl. ...................... 707/102; 707/101; 707/100
(58) Field of Search ................................ 707/100–102, 707/1, 10, 200, 103 R, 203; 710/2; 711/156; 717/10, 120, 108, 126, 105

(56) References Cited

U.S. PATENT DOCUMENTS 6,662,357 B1 * 12/2003 Bowman-Amuah ......... 717/120

* cited by examiner

Primary Examiner—Charles Rones
Assistant Examiner—Neveen Abel-Jalil

(74) Attorney, Agent, or Firm—Perkins Coie LLP

(57) ABSTRACT

A method, system, and computer-readable medium for creating visual data models from multiple inter-related model segments is described. In order to create inter-relationships between model elements in different model segments, a model segment can include one or more external model elements. Each external model element in a model segment is a reference to another actual model element whose definition or description is located outside the model segment (e.g., in another model segment). After an external model element is created in a model segment, a variety of relationships can be defined between the external model element and other model elements in the model segment. Such a relationship with an external model element signifies a relationship with the actual model element represented by the external model element. If a model segment contains a necessary external model element, such as one to which a relationship exists, the model segment does not define a complete model because the definition or description for the external model element is not contained in the model segment. Thus, when multiple model segments are inter-related via external model elements, all of the model segments may be necessary to form a complete model. To form a complete model, the various model segments are therefore combined and the resulting combined model is verified to be complete.

50 Claims, 15 Drawing Sheets

CREATING VISUAL DATA MODELS COMBINING MULTIPLE INTER-RELATED MODEL SEGMENTS

TECHNICAL FIELD

The following disclosure relates generally to creating visual data models, and more particularly to creating such data models by combining multiple model segments containing inter-related visual model elements.

BACKGROUND

In the past, models have been created to represent a wide variety of real-world situations or objects (i.e., model targets). One type of model is a block diagram model, in which elements of the target are represented with blocks, and in which most relationships between the elements are represented with lines between the blocks. In such diagrams, multiple blocks may be associated in various ways, such as a particular block being an aggregate of multiple other blocks.

Block diagram models can represent a wide variety of target types, including processes, physical structures, and logical structures. In the computer realm, block diagrams have been used to represent a wide variety of targets, such as databases composed of inter-related tables, inter-related data structures or objects to be used in conjunction with one or more computer programs, and the inter-related functions or modules of a computer program.

While block diagram models were originally created on paper, a variety of computer modeling programs have recently emerged that allow computer-based models to be created. Of these programs, recent ones allow the models to be created in a visual manner by using the user interface of the program to draw the model elements and their relationships (e.g., using various shape templates and a drag-and-drop metaphor). With such visual models, each model element and relationship typically has at least one visual representation so that the entire model can be easily displayed to a user. The process of creating or modifying such visual models is simplified by the ability to easily view the inter-related nature of the existing model elements, and to quickly draw new model elements and relationships.

A variety of types of modeling methodologies have been developed in which models can be expressed, with each computer modeling program typically supporting one or more such methodologies. These methodologies include Entity-Relationship (ER) modeling, Object-Role Modeling (ORM), and Unified Modeling Language (UML) modeling, as well as various other methodologies. Such modeling techniques and their uses are well known in the art, and are discussed in a wide variety of information sources including the following, which are hereby incorporated herein by reference: "Database Modeling & Design, Third Edition," Toby J. Teorey, Morgan Kaufman Publishers, San Francisco, Calif. (1999); "Data Modeling," G. Lawrence Sanders, Boyd And Fraser Publishing Company, An International Thomson Publishing Company, Danvers, Mass. (1995); and "Database Design for Smarties: Using UML for Data Modeling," Robert J. Muller, Morgan Kaufman Publishers, San Francisco, Calif. (1999).

Computer-based visual models also provide benefits other than simplifying the process of creating or modifying such models. For example, when the target of such a model is also a computer-based construct (e.g., a data structure, database, object, program module, etc.), it may be possible to automatically generate the target from the computer-based visual model. In this manner, creation of such targets can be greatly simplified.

For a computer-based visual model to generate a computer-based target, however, the model may have to satisfy one or more conditions. In particular, the computer model may need to be complete so that each required model element and relationship of the model is fully specified. For example, if a logical model of a database is created in which the definition of a first table includes an attribute of a second table, then the second table may also need to be defined as part of the logical model in order to complete the model. Until the logical database model is complete, a physical database schema that reflects the logical model cannot typically be generated. The process of determining that a model is complete is referred to as verification. In addition to completeness, some models may also need to be valid in order to generate a computer-based target. For example, if constraints have been imposed on the model (e.g., that limit the types of allowed relationships for a particular model element), those constraints must typically be satisfied in order for the model to be valid. The process of determining that such a model is valid is referred to as validation.

Since computer-based visual models provide a variety of benefits, it is important that the creation of such models be simplified as much as possible. However, a variety of problems exist with the creation of such models using current techniques. For example, since the model elements of such models are inter-related, a particular model is typically specified as a single entity, often in a single file. However, as such models grow increasingly large, it is difficult for any given user to modify or extend the model, since it typically is necessary to understand the entire model in order to modify or extend even a small subset of the model. Moreover, if the model is specified as a single entity, only one user at a time may be able to access or modify the model. Such limitations hinder the creation of such models.

Another problem with the creation of computer-based visual models involves the re-use of portions of a model. Since a model is typically a single entity with inter-related model elements, the re-use of a portion of a model in another model can be difficult or impossible. If such re-use is even possible, it may involve a complicated manual procedure as follows: selecting the relevant subset of model elements and relationships from the first model; determining how the selected model elements in the subset are inter-related to model elements outside the subset; determining how the model elements in the subset need to be modified when they are removed from the first model in order to reflect or remove the inter-relationships with the model elements outside the subset; performing the modifications to the model elements in the subset; and then adding the modified model elements to another model so that inter-relationships between those model elements and the other model elements of the new model can be specified.

Thus, a need exists for simplifying the creation of computer-based visual models with inter-related model elements, particularly by multiple users. In addition, a need exists for simplifying the re-use of portions of such models. A facility that provides these and other benefits is described below.

SUMMARY

Some disclosed embodiments provide a method, system, and computer-readable medium for creating multiple inter-related visual model segments and for creating visual data models from such model segments. In particular, in some embodiments a complete model is assembled that includes model elements from different model segments by first receiving an indication of a first model segment that contains a description of a first model element having a first structure, a reference to a second model element whose description is contained in a second model segment and that has a second structure, and an indication of a relationship between the first and second model elements that represents an alteration of at least one of the first and second structures, and by then creating the complete model by retrieving the description of the second model element from the second model segment and replacing the reference to the second model element with the retrieved description.

In other embodiments, one of multiple model segments that are to be assembled into a complete model is created by receiving an indication of a first model element having a first structure, by receiving an indication of a reference to a second model element whose description is contained in another model segment and that has a second structure, by receiving an indication of a relationship between the first and second model elements that represents an alteration of at least one of the first and second structures, and by creating the one model segment by creating a description of the first model element in the one model segment, creating an indication of the reference in the one model segment, and creating an indication of the relationship in the one model segment.

In yet other embodiments, a complete model is created that when displayed includes visual representations of model elements from different model segments and of a relationship between the model elements by first receiving an indication of a first model segment that when displayed contains a visual representation of a first model element, a visual representation of a reference to a second model element whose primary visual representation is contained in a second model segment when displayed, and a visual representation of a relationship between the visual representations of the first model element and the reference, and by then creating the complete model by retrieving from the first model segment indications of the visual representations of the first model element and the relationship, retrieving from the second model segment an indication of the primary visual representation of the second model element, and replacing the indication of the visual representation of the reference with the retrieved indication of the primary visual representation. In this manner, when the complete model is displayed, the visual representation of the relationship may indicate that the relationship exists between the visual representation of the first model element and the primary visual representation of the second model element.

DETAILED DESCRIPTION

Figure 1:
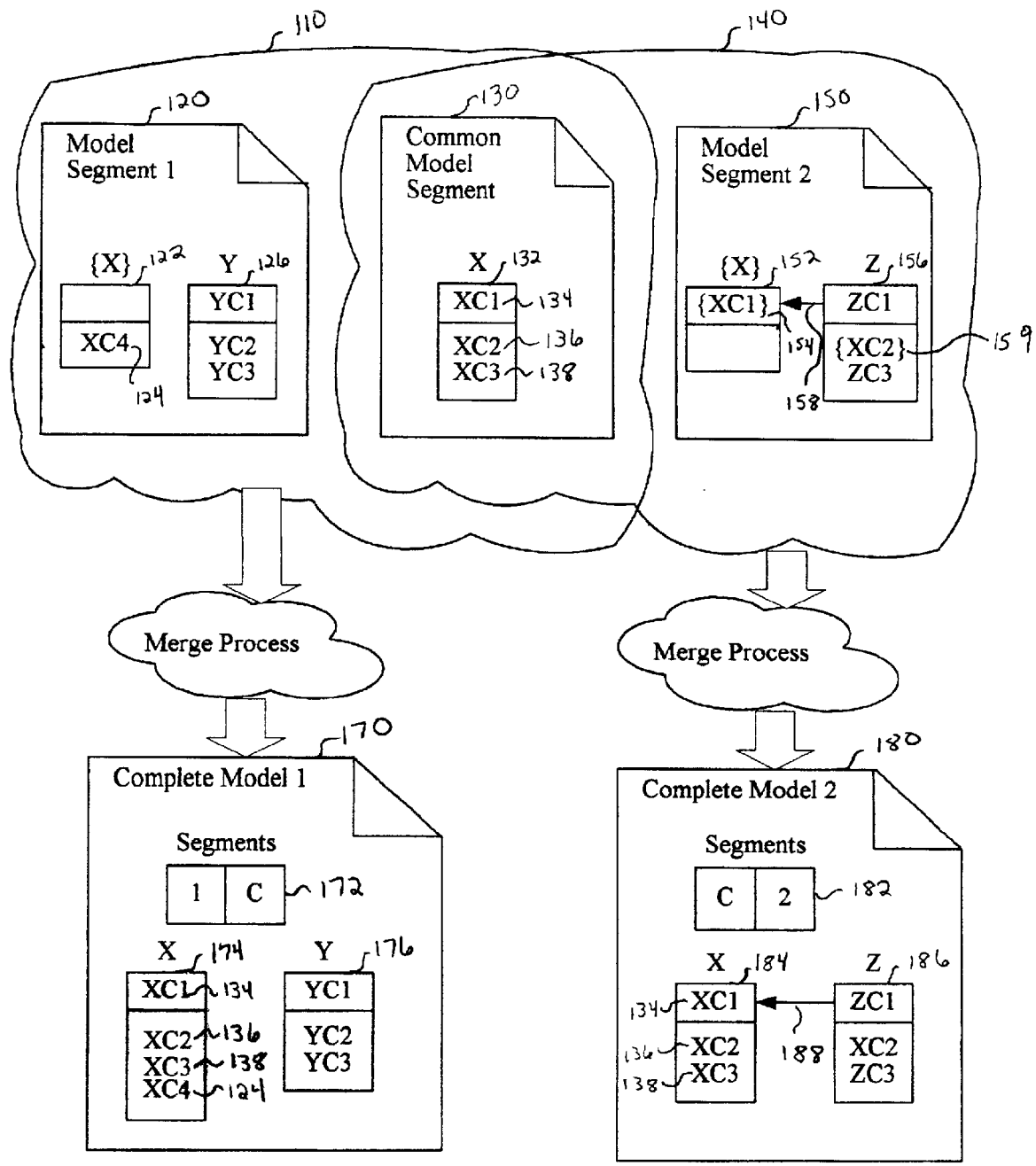
FIG. 1 illustrates model segments with inter-related model elements being combined to create multiple complete models in one embodiment.

A method, system, and computer-readable medium for creating visual data models from multiple inter-related visual model segments is described below. In particular, the Segmented Visual Modeler (SVM) system creates visual model segments containing model elements (MEs) and relationships between MEs. After multiple inter-related model segments have been created, the SVM system can combine those model segments together to create a complete visual model.

In some embodiments, each ME in a model segment has a definition or description associated with the model segment that describes the structure and properties of the ME. Similarly, each relationship in a model segment between MEs has a description or definition of how the structure and/or properties of one or both of the MEs may be altered by the relationship. In some embodiments, each ME and relationship also has a visual representation with which they can be displayed to a user.

Within a given model segment, a variety of types of relationships can exist between MEs. For example, one ME may be an attribute of another ME (e.g., in a database model, a column ME being an attribute of a table ME). Alternately, a relationship between two MEs can indicate a constraint on one or both of the MEs, such as on the types of data that the ME can represent.

In order to create inter-relationships between MEs in different model segments, a model segment can also include one or more external MEs. Each external ME in a model segment is a reference to another actual ME whose definition or description is located outside the model segment (e.g., in another model segment). In some embodiments, an external ME may indicate the location of the definition (e.g., a specific model segment), while in other embodiments the location of the definition will not be indicated. After an external ME is created in a model segment, a variety of relationships can be defined between the external ME and other MEs in the model segment. Such a relationship with an external ME signifies a relationship with the actual ME represented by the external ME.

If a model segment contains a necessary external ME, such as one to which a relationship exists, the model segment alone does not define a complete model because the definition or description for the external ME is not contained in the model segment. Thus, when multiple model segments are inter-related via external MEs, all of the model segments may be necessary to form a complete model. When forming a complete model, the various model segments are therefore combined, and the resulting combined model can additionally be verified to be complete. When inter-related model segments are combined, relationships with external MEs will be enforced with the actual MEs to which the external MEs refer. For example, if a relationship indicates a change in the structure of an external ME, the structure of the actual ME will be changed in the indicated fashion. The process of creating a complete model is discussed in greater detail below.

FIG. 1 illustrates an example in one embodiment of how multiple model segments with inter-related MEs can be combined to create multiple complete models. In particular, three inter-related model segments are shown in a block diagram format, along with an indication of how the three model segments can be combined to create two complete models. As an illustrative example of the use of such model segments, the MEs and relationships shown in FIG. 1 will be described as being part of a logical database model, with MEs representing database tables and columns. Those skilled in the art will appreciate that the visual representations and the described combination process can be used with a wide variety of modeling methodologies and for a wide variety of model targets.

As is illustrated, Common Model Segment 130 contains an ME X 132 that includes three other MEs XC1 134, XC2 136, and XC3 138. In particular, X represents a table and, as part of the structure of table X, XC1, XC2, and XC3 represent column attributes of the table. The XC1 attribute represents a primary key attribute of table X, as indicated by showing XC1 above the internal line in the visual representation of table X.

Model Segment 1 120 similarly includes an ME table Y 126 that includes ME attributes YC1, YC2, and YC3. Model Segment 1 also includes an external ME table {X} 122 that references ME X in the Common Model Segment. In the illustrated embodiment, external MEs are indicated by enclosing the name of the referenced ME in brackets. As is shown, external ME {X} 122 includes ME XC4 124 as an attribute. Since XC4 is shown without brackets, ME XC4 is not external to Model Segment 1.

To generate a database schema that includes table Y, a complete model that includes the MEs of Model Segment 1 must typically first be formed. Since Model Segment 1 includes the external object {X} 122, however, Model Segment 1 alone cannot form a complete model. Instead, as is indicated by model segment grouping 110, Model Segment 1 and Common Model Segment can be combined via a merge process to create Complete Model 1 170 that includes table Y. A database schema can then be created from Complete Model 1. Those skilled in the art will appreciate that an appropriate model segment grouping can be determined in a variety of ways, such as based on manual selection, or based instead on an automated analysis of the external MEs and relationships in one or more model segments in order to determine the minimum necessary set of model segments that define all of the contained MEs and relationships.

When Complete Model 1 is created from Model Segment 1 and Common Model Segment, the complete model contains ME tables Y 176 and X 174. Since table Y 126 did not include any external MEs or relationships that would affect the structure of the table, table Y 176 after the merge process is the same as table Y 126 before the merge process. Conversely, Model Segment 1 does define a relationship that modifies the structure of table X 132 by adding ME XC4 to external ME {X} 122. Thus, after the merge process, table X 174 includes the ME attributes XC1, XC2, and XC3 specified in Common Model Segment as well as ME attribute XC4 specified in Model Segment 1.

Complete Model 1 also includes an indication 172 of the model segments that were used in its creation. In the illustrated embodiment, when Complete Model 1 is displayed to a user, a visual representation of indication 172 can also be displayed to provide to the user an indication of the source model segments used to create the model. However, when Complete Model 1 is used in the illustrated embodiment to generate a database schema, the indication 172 is not used as part of the generation process. Those skilled in the art will appreciate that in some embodiments such indications will not be included in combined models. Alternately, in other embodiments such indications can be used in other manners, such as to track the dependency of the combined model on the source model segments used to create the combined model so that a new combined model can be automatically created when one of the source model segments is modified.

Since Model Segment 2 150 is not inter-related with Model Segment 1, Model Segment 2 was not needed to create Complete Model 1. However, Model Segment 2 is inter-related with Common Model Segment, and the grouping 140 of those two model segments can be used to produce Complete Model 2 180. In particular, Model Segment 2 includes an ME table Z 156, and an external ME table {X} 152 that references ME X in the Common Model Segment. Table Z includes non-external ME column attributes ZC1 and ZC3, and also includes an external ME column attribute {XC2} 159 that references ME 136 in Common Model Segment. In addition, a relationship 158 is defined between ME Z and the external ME primary key attribute {XC1} of external ME table 152.

When the merge process is performed for model segment grouping 140, Complete Model 2 is produced. Complete Model 2 contains ME tables X 184 and Z 186 that correspond to tables Z and {X} 152. As part of the merge process, external ME column attribute {XC2} 159 in table Z 156 has been replaced with the ME it references, column attribute XC2, in table Z 186. Similarly, the external ME primary key attribute {XC1} of external ME table {X} 152 has been replaced in table X 184 with XC1, and column attributes XC2 and XC3 from Common Model Segment have been added to table X 184. Complete Model 2 also includes an indication 182 of the model segments that were used in its creation.

The illustrative example of FIG. 1 demonstrates how the SVM system can be used to simplify the creation of complete models and the re-use of portions of models. For example, in the illustrative embodiment, Common Model Segment may have been created by User 1 who has an expertise in the types of information to be included in table X. While User 1 is specifying the details of table X in Common Model Segment, Model Segment 1 can be simultaneously being created by User 2 who has an expertise in the types of information to be included in table Y. In this manner, neither user is required to understand all of the domain to be covered by Complete Model 1, and Complete Model 1 can be completed more rapidly because multiple users can simultaneously be creating portions of the model.

In addition, as User 2 is creating table Y, User 2 may realize that a type of information to be stored in the database being modeled fits more naturally with table X than with table Y. Rather than manually contacting User 1 and requesting that User 1 add a column attribute XC4 to table X to store that type of information, User 2 can directly add attribute XC4 to an external reference of table X. Those skilled in the art will appreciate that User 2 can determine the existence of table X in a variety of ways, such as by reading an evolving or finished definition of table X from Common Model Segment, by manually obtaining table X definition information from User 1, or by obtaining only the name of table X and adding attribute XC4 without knowing the structure of table X in Common Model Segment (e.g., if duplicate attributes are ignored). Similarly, those skilled in the art will appreciate that User 2 can create an external reference to table X in a variety of ways, such as by identifying table X in Common Model Segment and creating a link to it, or by specifying the table as external without knowing in what model segment the table is defined (e.g., if the merge process can identify the appropriate model segment and ME).

The SVM system also simplifies the re-use of portions of models. For example, when User 1 created table X in Common Model Segment, User 1 may have included only the minimal set of tables and attributes that are required for a particular domain. At some later point, User 1 may decide to create a new database that models an expanded part of the domain beyond the minimal set in Common Model Segment. Rather than modifying Common Model Segment (and perhaps introducing errors for complete models such as Complete Model 1 that used the old definitions in Common Model Segment), User 1 can instead create Model Segment 2 with an external reference to table X and a new table Z that relates to table X. In this way, the single minimal definition for table X in Common Model Segment can be expanded into multiple distinct databases by creating multiple model segments that inter-relate with the table. Such expansion or modification of a base model element allows polymorphic behavior to be implemented with respect to model elements.

Those skilled in the art will appreciate that the various model segments to be combined can be created by a single user or by any number of different users, and that a single model segment can similarly be created by a single user or by multiple users (e.g., sequentially). Those skilled in the art will appreciate that in the illustrated embodiment, the various MEs each have unique names to facilitate easy discussion. However, MEs do not generally need unique names—instead, each ME and relationship in a model segment will typically have some type of unique identifier (UID) among all the model segments with which the model segment is inter-related. Such a UID can be specified in a variety of ways, with unique names being one example. In addition, those skilled in the art will appreciate that in the illustrated embodiment, Common Model Segment could create a complete model (not shown) by itself that, since there are no external MEs contained in Common Model Segment, would result in a single database table that is unrelated to other tables.

Figure 2A:
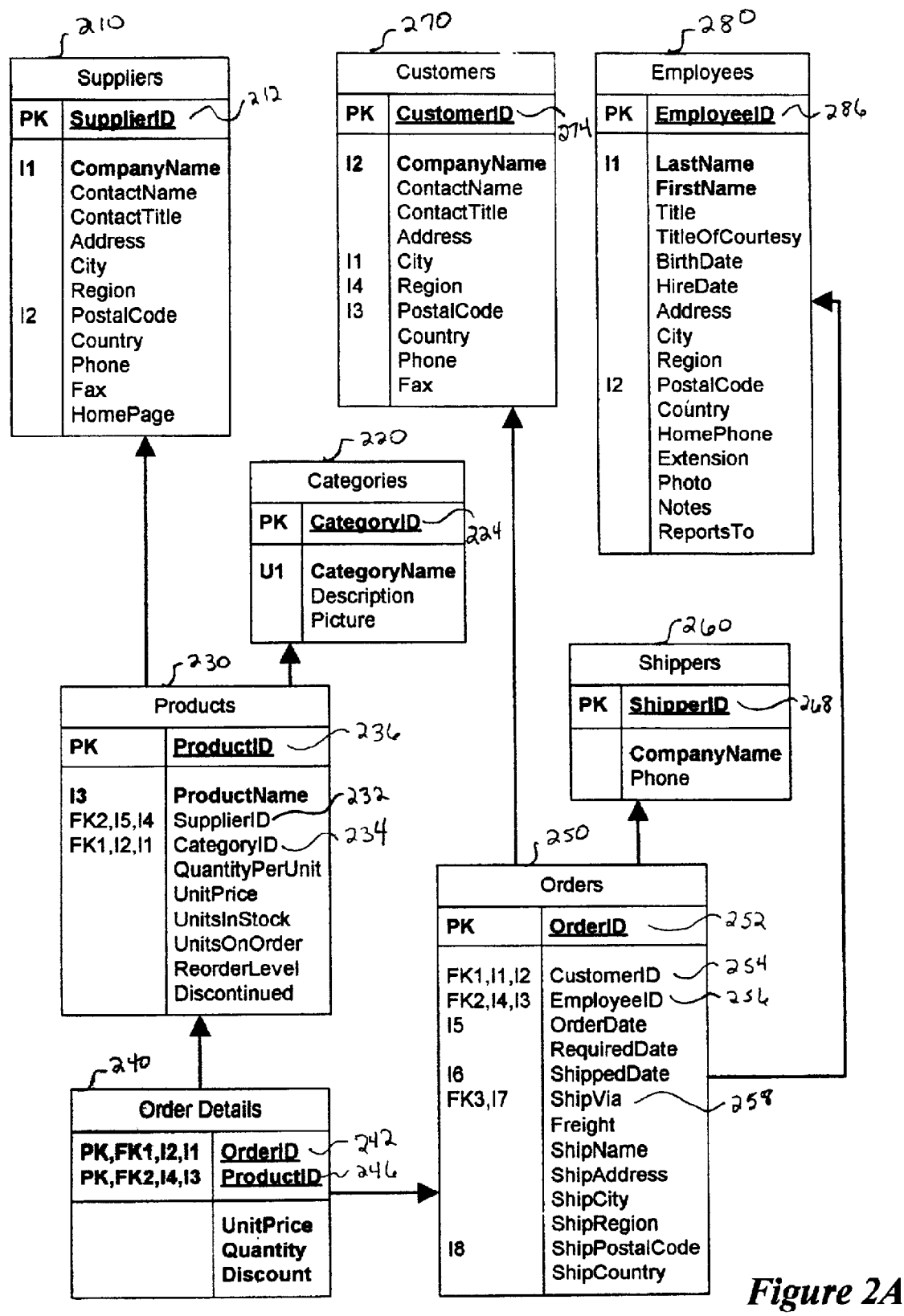
FIGS. 2A–2D illustrate an example visual database model formatted using a form of Entity-Relationship modeling, as well as how such a model can be created from multiple model segments.

FIGS. 2A–2D illustrate an example visual database model formatted using a form of Entity-Relationship modeling, as well as how such a model can be created from multiple model segments. In particular, FIG. 2A illustrates a complete model consisting of 8 inter-related tables, those being Suppliers 210, Categories 220, Products 230, Order Details 240, Orders 250, Shippers 260, Customers 270, and Employees 280. While this complete model could be formed from a variety of groupings of different model segments, FIGS. 2B–2D demonstrate three illustrative model segments which can be combined to create the complete model.

Figure 2B:
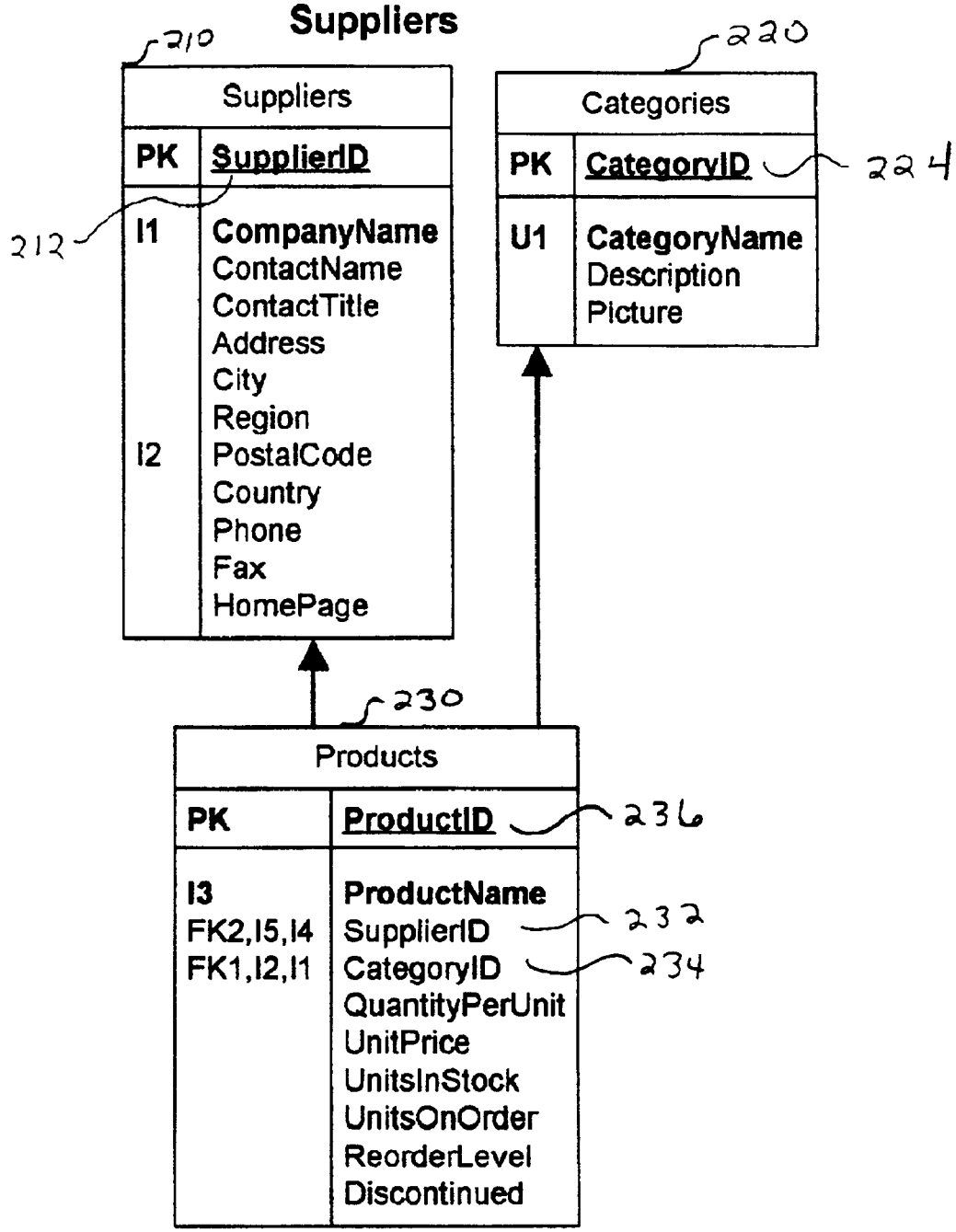

FIG. 2B illustrates the model segment Categorized Products And Suppliers that contains ME tables Suppliers 210, Categories 220, and Products 230. As is shown, the ME primary key attributes SupplierID 212 of the Suppliers table and CategoryID 224 of the Categories table correspond respectively to ME foreign key attributes SupplierID 232 and CategoryID 234 of the Products table. This correspondence is one type of relationship between tables, thus creating the relationships between those tables as shown. No external MEs have been created in this model segment. The Suppliers table has a variety of other column attributes as shown, and also has indexes defined on columns CompanyName and PostalCode. The CompanyName column is indicated as requiring a value for each entry since it is displayed in bold. The Categories table similarly has a variety of other column attributes, and also has a required column CategoryName with the constraint that each value in the column be unique (as with a primary key column attribute). In this way, a variety of types of table and column structures can be visually indicated.

Figure 2C:
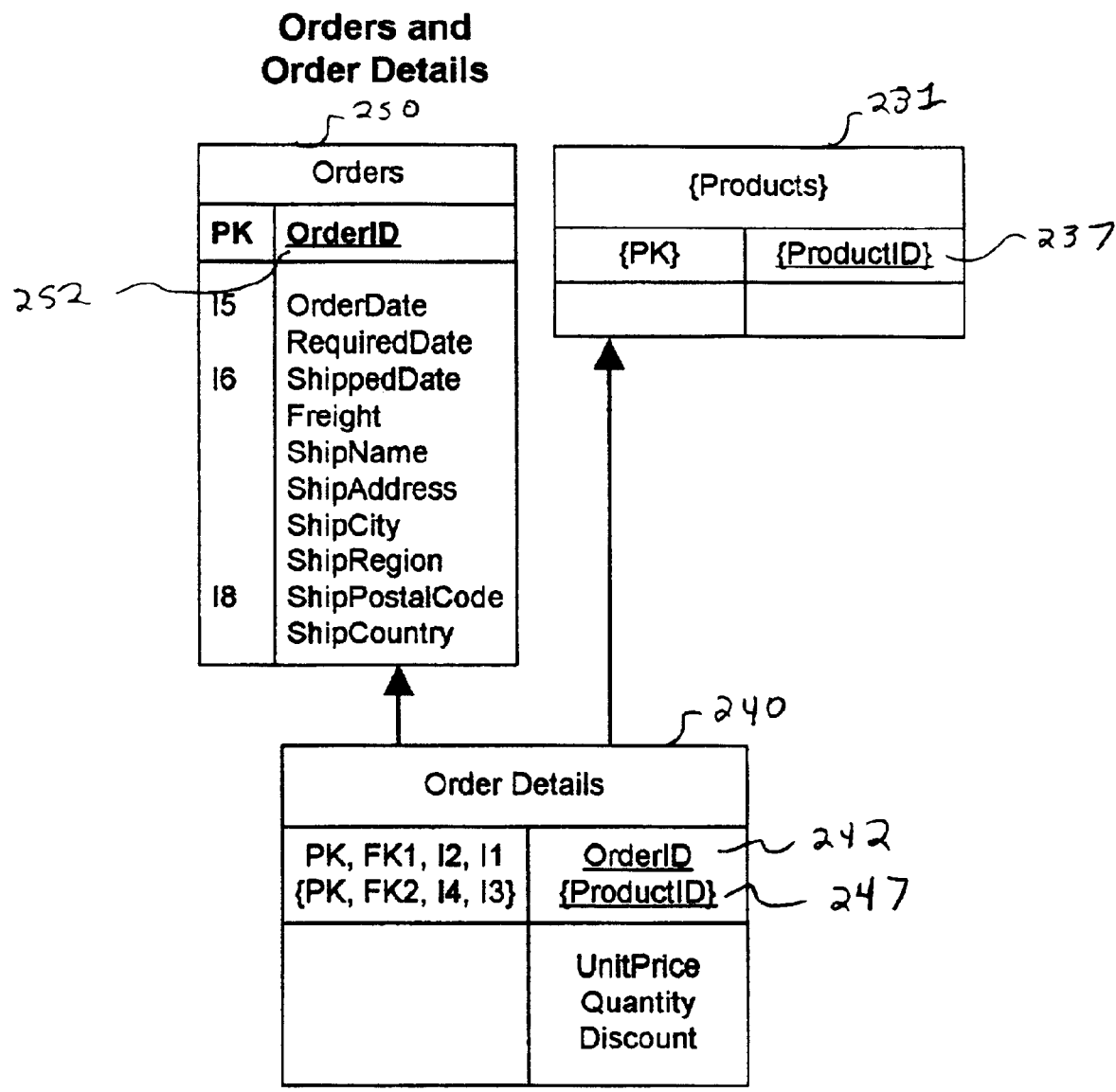

FIG. 2C illustrates the model segment Orders And Order Details that contains ME tables Order Details 240 and Orders 250, and also contains external ME table {Products} 231 referencing the ME table Products 230 of the Categorized Products And Suppliers model segment. As is shown, the ME primary key attribute OrderID 252 of the Orders table corresponds to ME primary key attribute OrderID 242 of the Order Details table, thus creating a relationship between those tables. Similarly, the {Products} table contains an external ME primary key attribute {ProductID} 237 that references ME attribute ProductID 236 of the Products 230 table, with the {ProductID} 237 attribute corresponding to external ME primary key attribute {ProductID} 247 of Order Details table. While those skilled in the art will appreciate that the {ProductID} 247 attribute is not generally required to be identical to the {ProductID} 237 attribute when such a relationship exists, in the illustrated embodiment these two external ME attributes do refer to the same ProductID 236 attribute. Thus, not only can an ME be referred to in some embodiments by multiple external MEs in different model segments, in other embodiments an ME can be referred to by multiple external MEs in the same model segment The Orders and Order Details tables also have additional structure as shown.

Figure 2D:
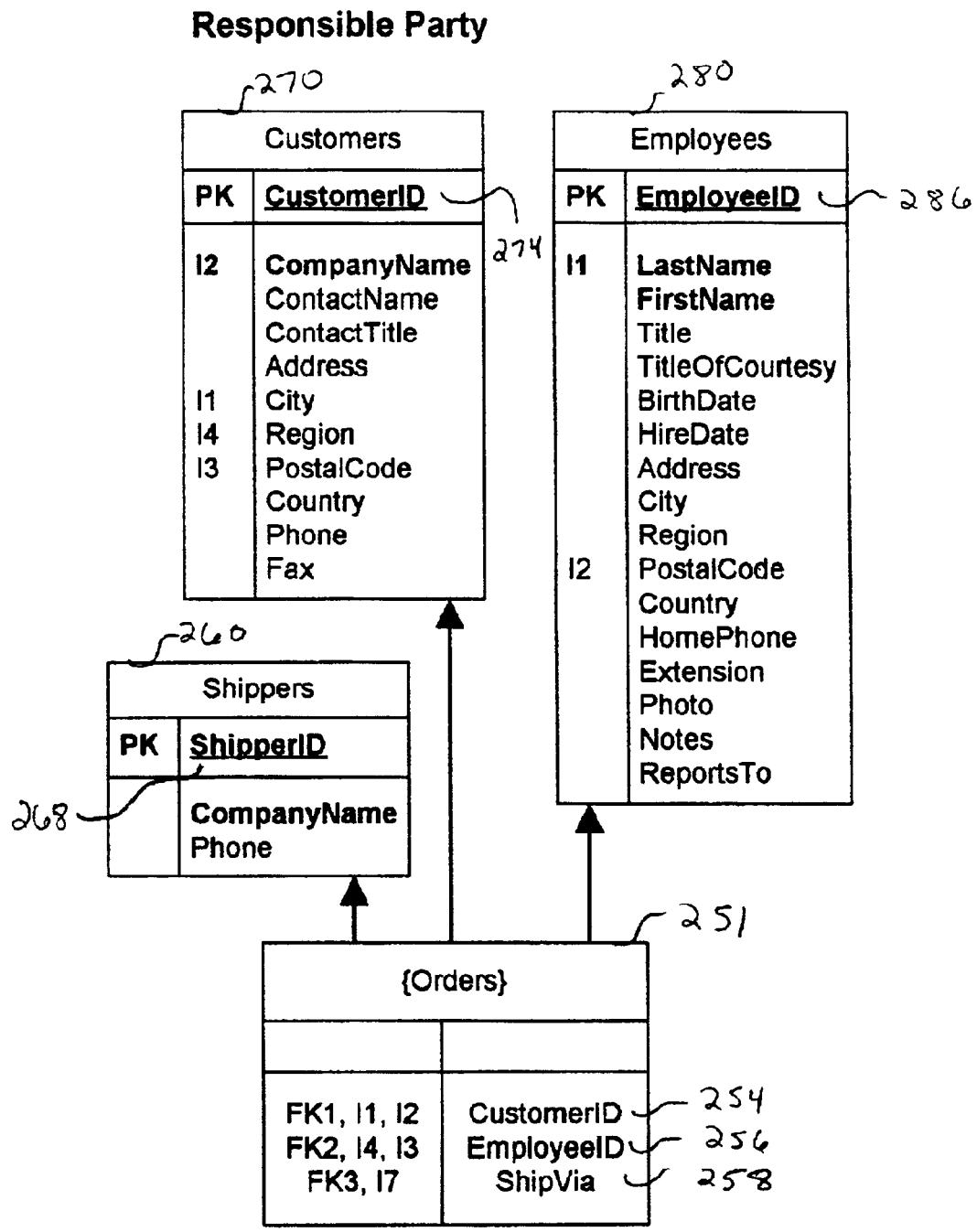

FIG. 2D illustrates the Responsible Party model segment that contains ME tables Shippers 260, Customers 270, and Employees 280. The model segment also contains external ME table {Orders} 251 that references the ME table Orders 250 of the Orders And Order Details model segment. As is shown, the ME primary key attributes ShipperID 268 of the Shippers table, CustomerID 274 of the Customers table, and EmployeeID 286 of the Employees table correspond to ME foreign key attributes ShipVia 258, CustomerID 254, and EmployeeID 256 respectively of the {Orders} table. Thus, for example, although the Orders table 250 is defined in the Orders and Order Details model segment, the foreign keys for the table are defined in the Responsible Party model segment The Shippers, Customers and Employees tables also have additional structure as shown.

Through a combination and verification process to be described in greater detail below, the Categorized Products And Suppliers, Orders And Order Details, and Responsible Party model segments can be combined to form the complete model shown in FIG. 2A. After creating the complete logical database model, a physical database schema can then be created that reflects the logical model.

Figure 3:
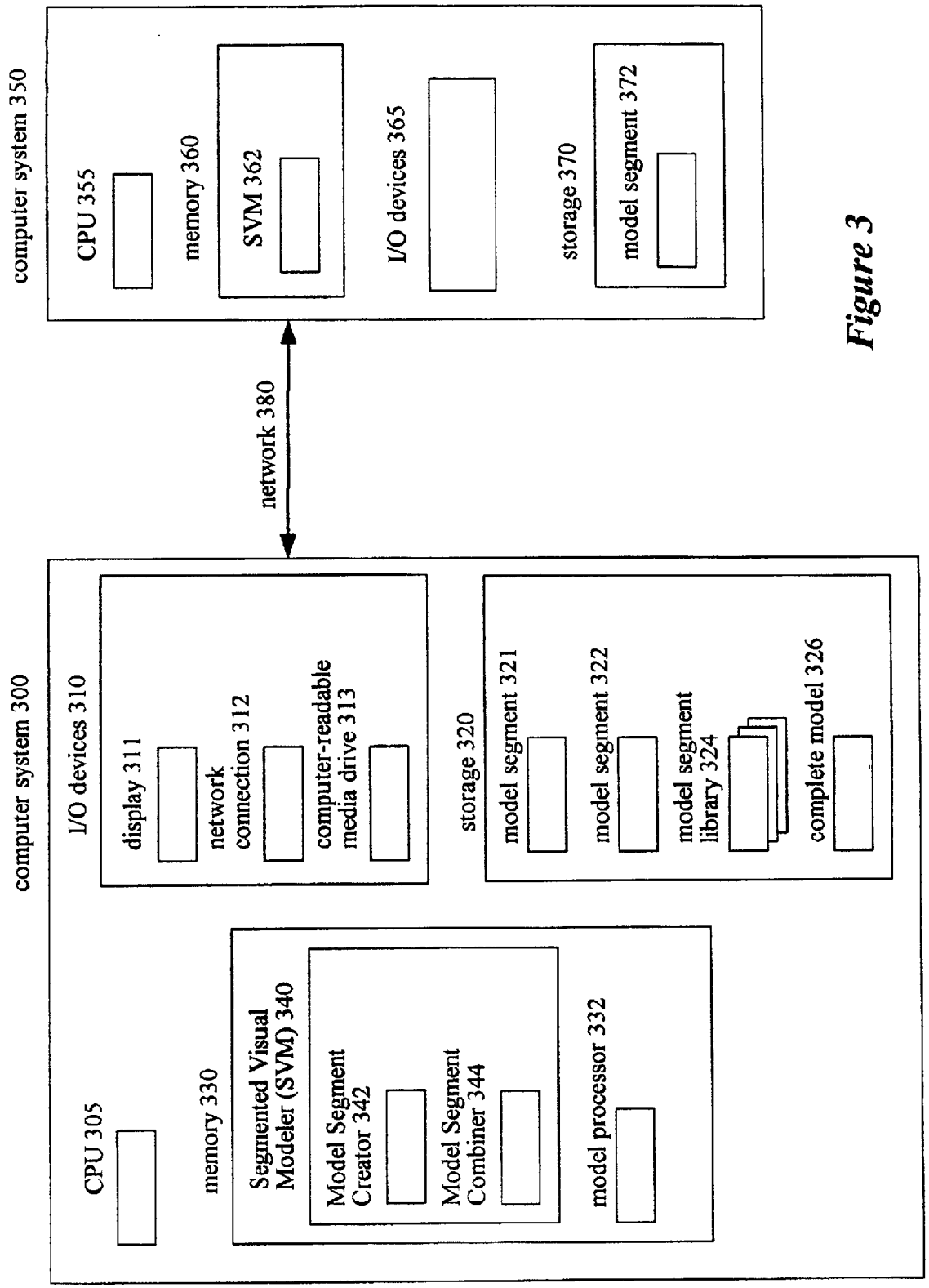
FIG. 3 is a block diagram illustrating an embodiment of the Segmented Visual Modeler system.

FIG. 3 illustrates a computer system 300 suitable for executing an embodiment of the SVM system, as well as a computer system 350 suitable for executing a second copy of an embodiment of the SVM system. The computer system 300 includes a CPU 305, various input/output (I/O) devices 310, storage 320, and a memory 330. The memory includes an executing copy of the Segmented Visual Modeler (SVM) 340, as well as an optional model processor program 332.

The SVM 340 includes a Model Segment Creator component 342 and a Model Segment Combiner component 344. A user of the computer system (not shown) can use one or more I/O devices to interact with the executing Model Segment Creator module so as to create one or more model segments. As described above, in some embodiments each ME and relationship has a visual representation, and in such embodiments the one or more model segments being created can be displayed to the user on the display 311. Moreover, in some embodiments the user creates the model segments visually by drawing the MEs and the relationships of the model segment. As the user creates model segments, these model segments can be stored for later use, such as model segments 321 and 322 on storage 320, or can instead be stored on a computer-readable medium (not shown) in the computer-readable media drive 313.

When a user wants to create a complete model from one or more existing model segments, the user can use one or more I/O devices to interact with the executing Model Segment Combiner module. After receiving indications of the one or more model segments as input, the Model Segment Combiner then combines the model segments and verifies that a complete model has been created. Such a complete model can be created regardless of whether the indicated model segments are created by the user or another user. For example, the user may use the Model Segment Combiner to create a complete model from locally stored model segments 321 and 322. Alternately, the Model Segment Combiner may retrieve one or more model segments to be used in the combination process from a remote source over network 380 by using the network connection 312, such as model segment 372 stored on the storage 370 of computer system 350. In yet other embodiments, a model segment library 324 may be available (e.g., supplied by a third party), such as on storage 320 or via the network 380, that includes various pre-defined model segments or model elements that can be used by the Model Segment Combiner. Those skilled in the art will appreciate that model segments to be combined can be specified in a variety of ways, such as by an explicit list of model segments, by a grouping that indicates various model segments, by an indication of a desired complete model for which the necessary source model segments can be determined by the SVM, etc.

After a complete model is created, it can be stored for later use (e.g., as complete model 326 on storage 320), displayed by the SVM on the display, and/or forwarded to another program for additional processing. For example, optional model processor program 332 can receive complete logical database models from the SVM, and can generate physical database schema based on the models. Alternately, in some embodiments the SVM or an optional other program could do additional checking on a complete model, such as validating the model.

As mentioned above, a second copy of the SVM can be executing in memory 360 of computer system 350. Thus, a user of computer system 300 can be creating a model segment using SVM 340 while a different user of computer system 350 can simultaneously be creating a model segment using SVM 362. Those skilled in the art will appreciate that an unlimited number of SVMs can be executing simultaneously.

Those skilled in the art will also appreciate that computer systems 300 and 350 are merely illustrative and are not intended to limit the scope of the present invention. The SVM system may be stored as instructions on a computer-readable medium, such as a hard disk, memory, or portable article to be read by an appropriate drive. Similarly, the data structures of the SVM system, including model segments, complete models, and definitions or descriptions of MEs and relationships, may also be stored on a computer-readable medium. Moreover, the SVM system instructions and data structures can also be transmitted as generated data signals on a variety of transmission mediums, including wireless-based and wired/cable-based mediums.

In addition, the computer systems 300 and 350 may contain additional components not shown (e.g, various standard I/O devices) or may lack some illustrated components. Computer system 300 may also be connected to other devices which contain accessible documents or files (e.g., model segments), including through a network, through the Internet or via the World Wide Web (WWW). Accordingly, the present invention may be practiced with other computer system configurations.

Figure 4:
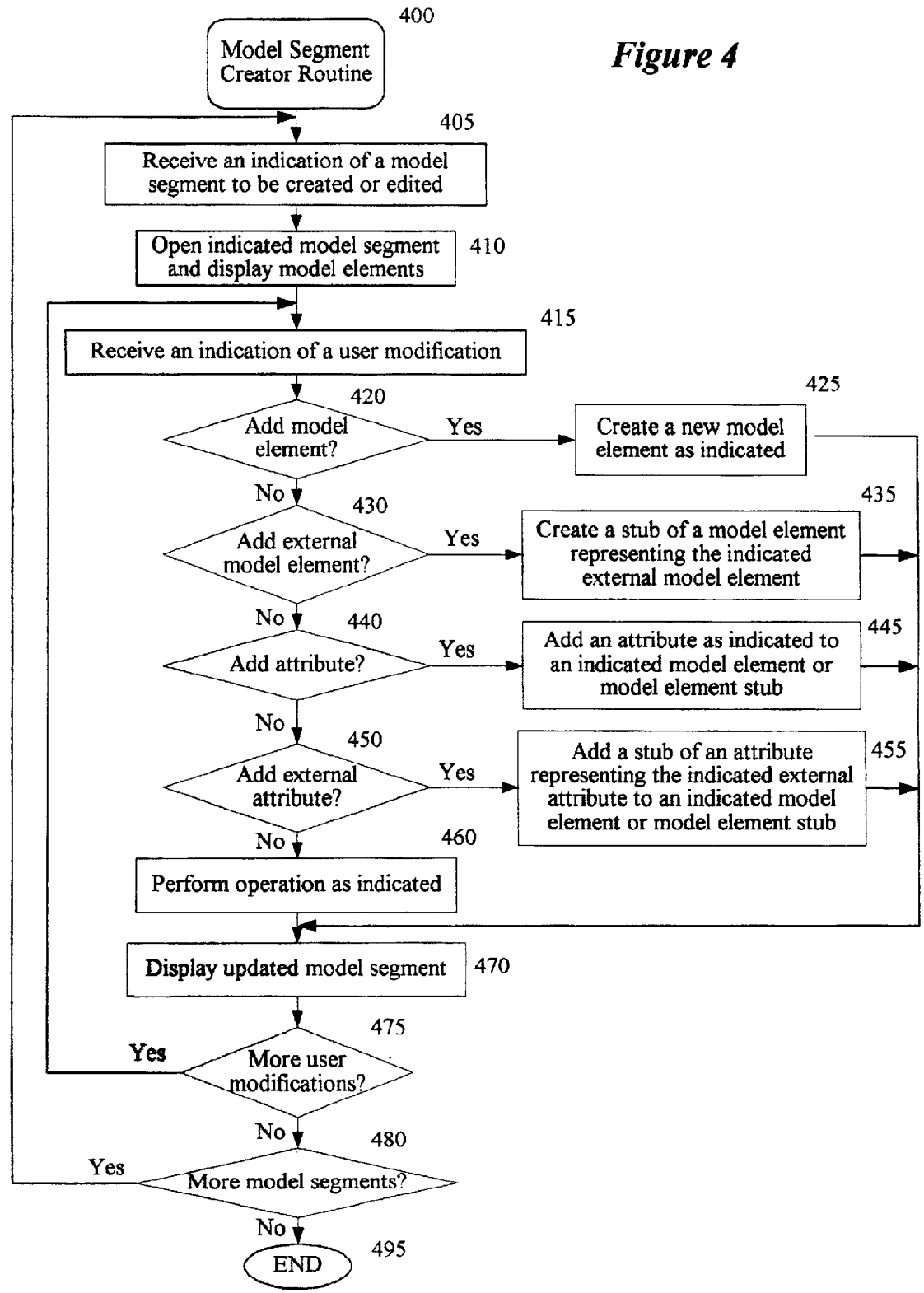
FIG. 4 is a flow diagram of an embodiment of the Model Segment Creator routine.

FIG. 4 is a flow diagram of an embodiment of the Model Segment Creator routine 400. The routine creates a model segment that can include MEs that are inter-related to MEs in other model segments. In the illustrated embodiment, the routine treats ME attributes separately from MEs that include attributes. Those skilled in the art will appreciate that in other embodiments, no such distinctions may be used, or instead other distinctions between types of MEs can be used.

The routine begins at step 405 where it receives an indication of a model segment to be created or edited. The routine continues to step 410 where it opens the indicated model segment if an existing model segment is to be edited, or instead creates an indicated model segment if a new model segment is to be created. The model segment is then displayed, including displaying the visual representations of any existing MEs and relationships in an existing model segment.

The routine then continues to step 415. In steps 415–470, the routine will loop, creating new MEs as indicated or performing other model creation operations (e.g., creating relationships, removing existing MEs or relationships, altering visual representations of MEs and relationships, etc.). In step 415, the routine receives an indication from the user of a model segment modification to be performed. The routine continues to step 420 to determine if the modification is to add a new ME that is not an is attribute. If so, the routine continues to step 425 to create a new ME as indicated. If it is instead determined in step 420 that the modification is not to add a new ME that is not an attribute, the routine continues to step 430 to determine if the modification is to add a new external ME that does not reference an attribute. If so, the routine continues to step 430 to create an external ME, also referred to as a stub of an ME, that references the indicated actual ME.

If it is instead determined in step 430 that the modification is not to add a new external ME that is not an attribute, the routine continues to step 440 to determine if the modification is to add a new attribute. If so, the routine continues to step 445 to add an attribute as indicated to an existing ME or external ME stub as indicated. If it is instead determined in step 440 that the modification is not to add a new attribute, the routine continues to step 450 to determine if the modification is to add a new external ME attribute. If so, the routine continues to step 455 to add a stub of an attribute that references the indicated actual attribute. If it is instead determined in step 450 that the modification is not to add a new external attribute, the routine continues to step 460 to perform the other indicated model segment modification.

After steps 425, 435, 445, 455 or 460, the routine continues to step 470 to display the modified model segment to the user. The routine then continues to step 475 to determine if there are more user modifications to the model segment. If so, the routine returns to step 415, and if not the routine continues to step 480 to determine if there are more model segments to be created or modified. If so, the routine returns to step 405, and if not the routine continues to step 495 and ends.

Figure 5:
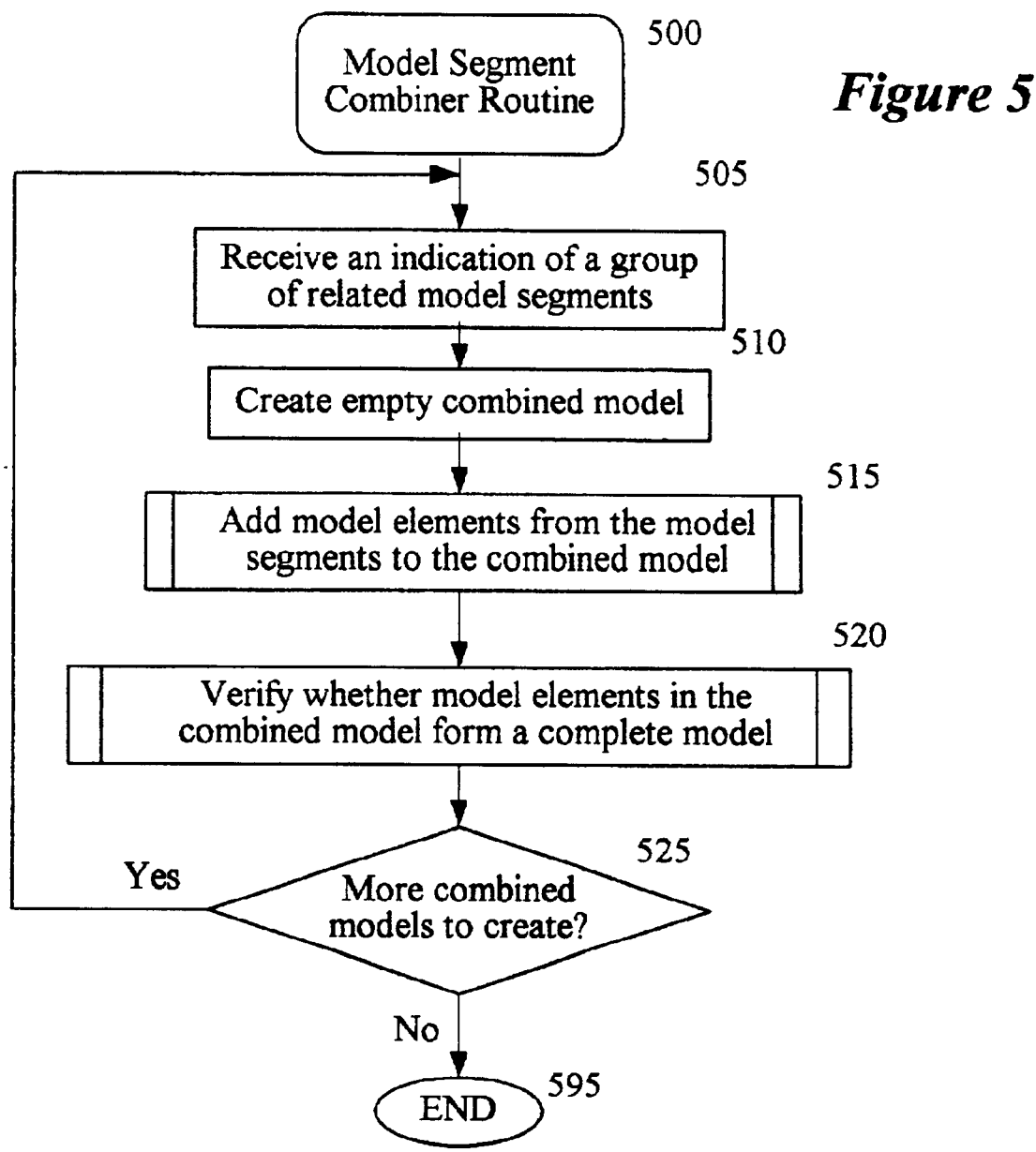
FIG. 5 is a flow diagram of an embodiment of the Model Segment Combiner routine.

FIG. 5 is a flow diagram of an embodiment of the Model Segment Combiner routine. The routine combines one or more model segments together to create a model, and verifies whether the resulting model is complete. In the illustrated embodiment, the routine does not treat ME attributes separately from non-attribute MEs. Those skilled in the art will appreciate that in other embodiments, that type of distinction or other distinctions between types of MEs can be implemented. In addition, in the illustrated embodiment an external ME or relationship merely references another ME or relationship via a UID, but does not have additional information about the location of the actual ME or relationship being referenced. Those skilled in the art will appreciate that in alternate embodiments, an external ME or relationship can include information about the location of the actual ME or relationship being referenced.

The routine begins at step 505 where it receives an indication of a group of one or more inter-related model segments. The routine continues to step 510 where it creates an empty combined model. The routine then continues to step 515 where it executes subroutine 515 to add the MEs and relationships from the indicated model segments to the combined model. The routine then continues to step 520 where it executes subroutine 520 to verify whether the MEs and relationships in the combined model form a complete model. The routine then continues to step 525 to determine if there are more combined models to create. If so, the routine returns to step 505, and if not the routine continues to step 595 and ends.

Figure 6:
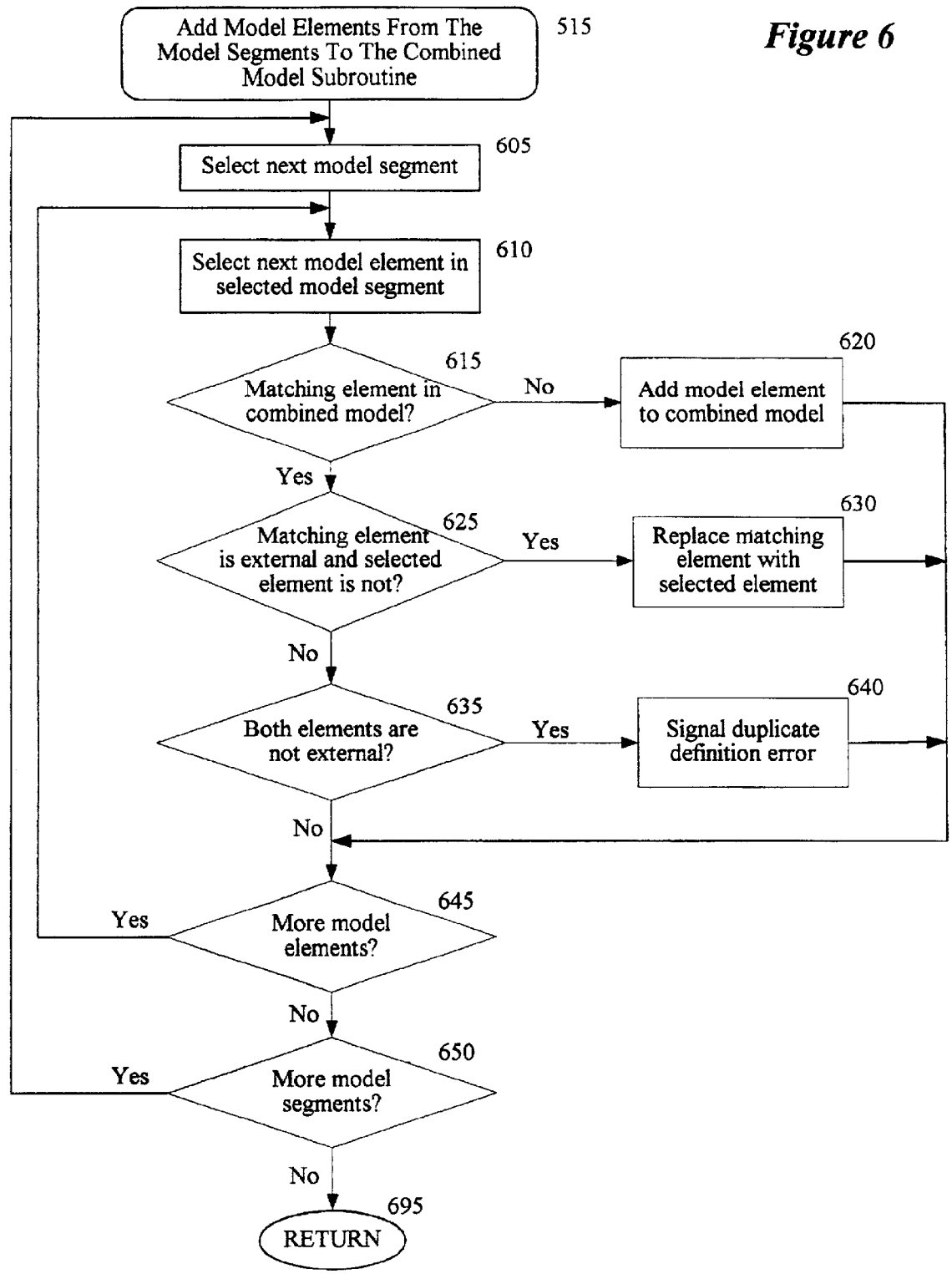
FIG. 6 is a flow diagram of an embodiment of the Add Model Elements From The Model Segments To The Combined Model subroutine.

FIG. 6 is a flow diagram of an embodiment of the Add Model Elements From The Model Segments To The Combined Model subroutine 515. The subroutine loops through one or more indicated model segments, and adds the MEs and relationships from the model segments to the combined model. As the MEs are being added, external MEs and relationships are replaced by the MEs and relationships that they reference. The subroutine also signals an error when a particular ME is defined more than once in the indicated model segments.

The subroutine begins at step 605 where it selects the next model segment of the model segments indicated in step 505, beginning with the first model segment. The subroutine then continues to step 610 where it selects the next ME (external or not) or relationship that the model segment contains, beginning with the first ME or relationship. The subroutine then continues to step 615 to determine if the combined model already contains a matching ME or relationship (e.g., for an external ME or relationship, the actual ME or relationship that is being referenced or another external ME or relationship that also references that actual ME or relationship) for the selected ME or relationship. If not, the subroutine continues to step 620 and adds the selected ME or relationship to the combined model. If it is instead determined in step 615 that the combined model already contains a matching ME or relationship, the subroutine continues to step 625 to determine if the matching ME or relationship is external and the selected ME or relationship is not external. If so, the definition or description that is referenced by the external ME or relationship in the combined model has been located, and the subroutine continues to step 630 to replace the matching ME or relationship in the combined model with the selected ME or relationship.

If it is instead determined in step 625 that it is not true that the matching ME or relationship is external and the selected ME or relationship is not external, the subroutine continues to step 635 to determine if both the selected and matching ME or relationship are not external. If so, the subroutine continues to step 640 to signal an error that the ME or relationship has multiple definitions in the indicated group of model segments. In the illustrated embodiment, the subroutine continues its processing even after such an error is signaled. Those skilled in the art will appreciate that in the situation when a matching ME or relationship is not external and the selected ME or relationship is external, the subroutine takes no action to add the selected ME or relationship or modify the matching ME or relationship.

After steps 620, 630, or 640, or if it was instead determined in step 635 that it is not true that both the selected and matching ME or relationship are not external, the subroutine continues to step 645 to determine if there are more MEs in the currently selected model segment. If so, the subroutine returns to step 610 to select the next ME or relationship in the model segment, and if not the subroutine continues to step 650 to determine if there are more model segments in the group of indicated model segments. If so, the subroutine returns to step 605, and if not the subroutine continues to step 695 and returns.

Those skilled in the art will appreciate that after the subroutine has executed, the combined model will contain all of the MEs and relationships defined in any of the indicated model segments, that any external MEs or relationships in the indicated model segments that reference actual MEs or relationships defined in other indicated model segments will be replaced by those actual MEs or relationships, and that MEs or relationships will multiple definitions in the indicated model segments will be detected and noted.

Figure 7:
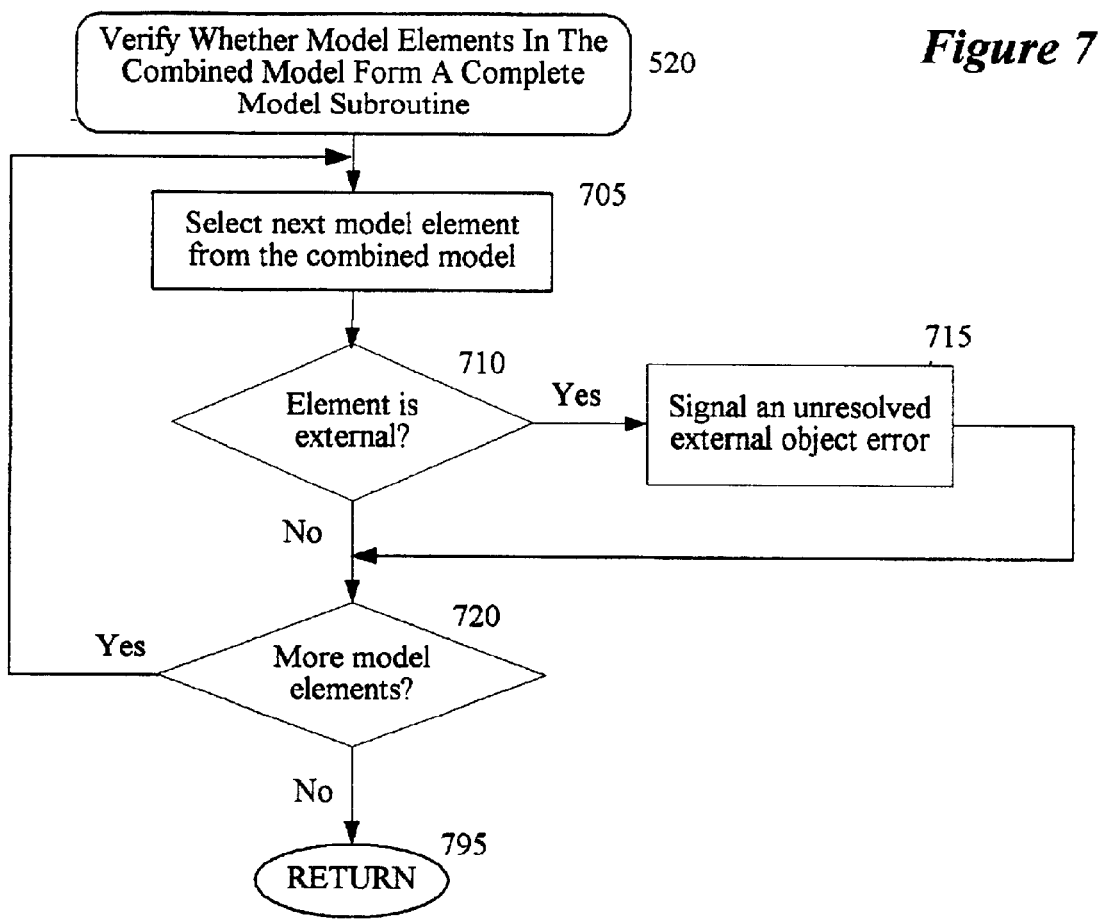
FIG. 7 is a flow diagram of an embodiment of the Verify Whether Model Elements In The Combined Model Form A Complete Model subroutine.

FIG. 7 is a flow diagram of an embodiment of the Verify Whether Model Elements In The Combined Model Form A Complete Model subroutine 520. The subroutine takes the combined model created by subroutine 515, and verifies that the combined model is complete. In particular, the subroutine identifies if there are any MEs or relationships in the combined model that are external, and thus that were not replaced by the actual MEs or relationships that they reference because the actual MEs or relationships were not defined in any of the indicated model segments.

The subroutine begins in step 705 where it selects the next ME or relationship from the combined model, beginning with the first ME or relationship. The subroutine then continues to step 710 to determine if the ME or relationship is external. If so, the subroutine continues to step 715 to signal an error that the ME or relationship is unresolved (i.e., does not have a matching actual ME or relationship in the indicated model segments). In the illustrated embodiment, the subroutine continues its processing even after such an error is signaled. After step 715, or if it was instead determined in step 710 that the selected ME or relationship is not external, the subroutine continues to step 720 to determine if there are more MEs or relationships in the combined model. If so, the subroutine returns to step 705 to select the next ME or relationship, and if not the subroutine continues to step 795 and returns. Those skilled in the art will appreciate that in the illustrated embodiment, the subroutine does not check for some factors that could be included in a verification process, such as whether there are stand-alone non-attribute MEs that are not related to any other non-attribute MEs in the combined model.

Those skilled in the art will also appreciate that while subroutine 515, which creates a combined model, and subroutine 520, which verifies that a combined model is complete, are executed together in the illustrated embodiment, in alternate embodiments these subroutines can be executed separately, or only one of the subroutines may be executed. Conversely, in other embodiments additional processing may be performed, such as validating complete models after the verification process.

Figure 8A:
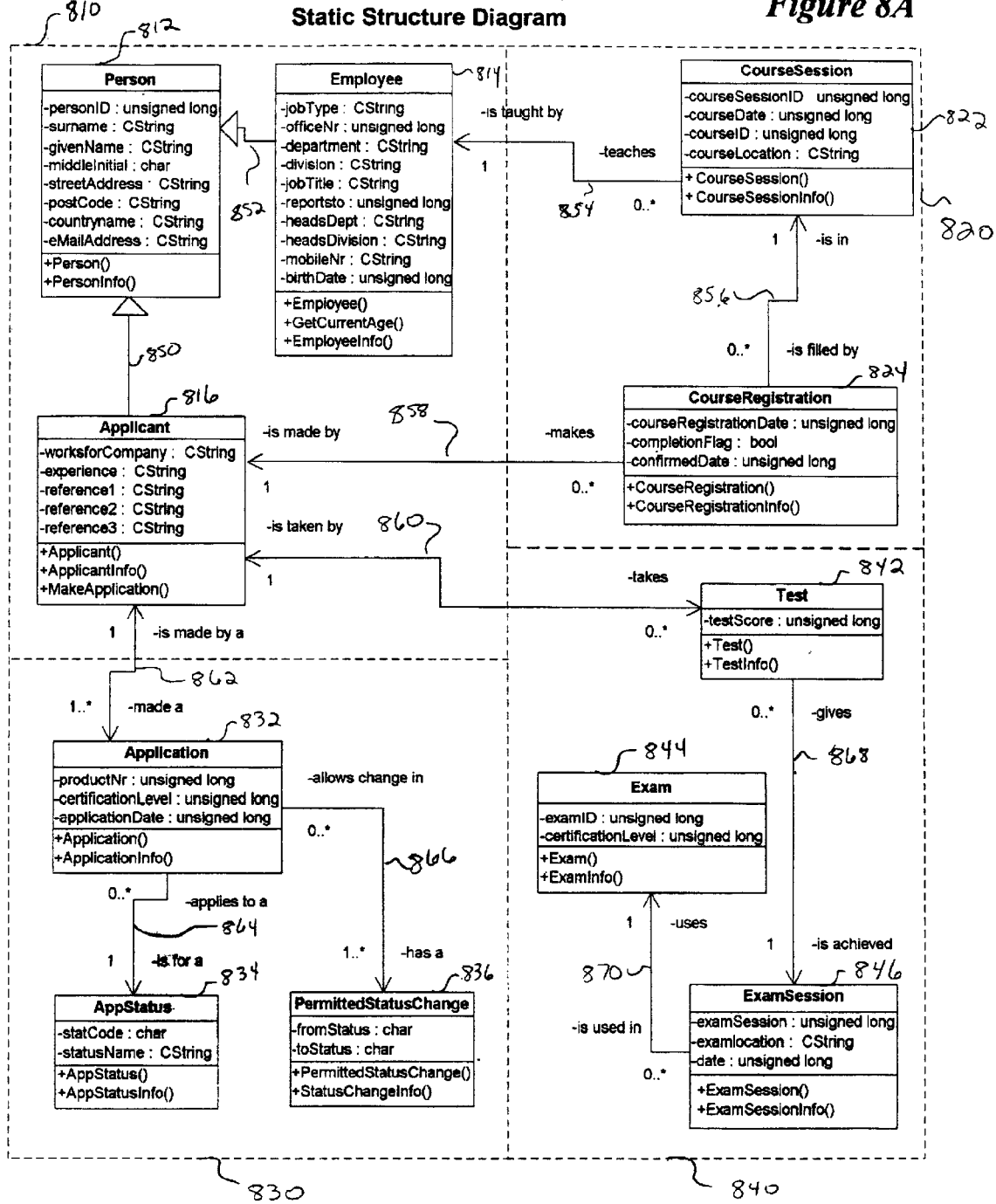
FIGS. 8A–8E illustrate an example visual data structure or object model formatted using the Unified Modeling Language (UML) methodology, as well as how such a model can be created with multiple model segments.

FIGS. 8A–8E illustrate an example visual data structure model or object model formatted using the Unified Modeling Language (UML) methodology, as well as how such a model can be created from multiple model segments. In particular, FIG. 8A illustrates a complete model consisting of 11 inter-related data structures, those being Person 812, Employee 814, Applicant 816, CourseSession 822, CourseRegistration 824, Application 832, AppStatus 834, PermittedStatusChange 836, Test 842, Exam 844, and ExamSession 846. While this complete model could be formed from a variety of groupings of different model segments, FIGS. 8B–8E illustrate four model segments which can be combined to create the complete model. The divisions of the MEs illustrated in FIG. 8A into the four groupings 810, 820, 830, and 840 are shown in FIG. 8A by the dotted lines.

Figure 8B:
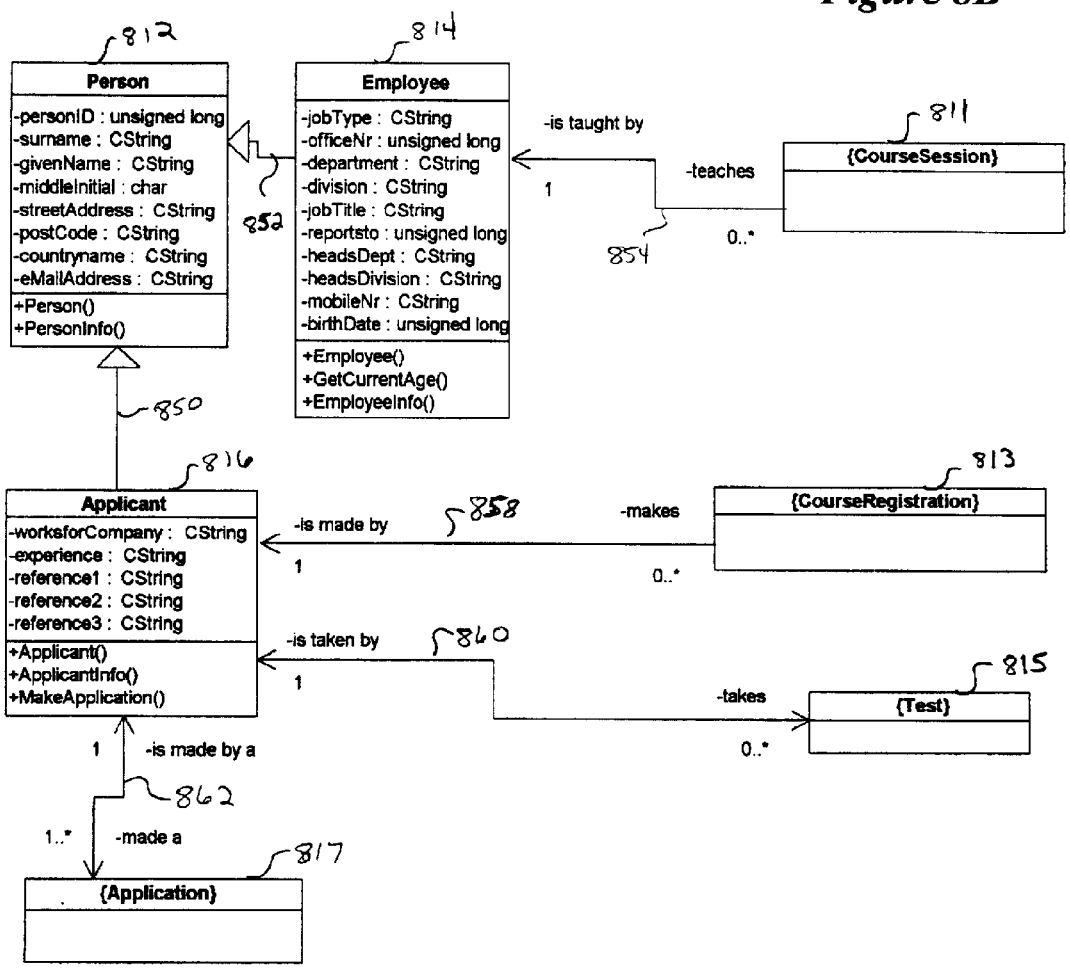

Thus, FIG. 8B illustrates a model segment that includes ME data structures used to represent people, including Person 812, Employee 814, and Applicant 816. Each of these data structures include a variety of ME data attributes and method attributes as shown. In order to show the relationships between these data structures and other related data structures, the model segment also includes external MEs {CourseSession} 811, {CourseRegistration} 813, {Application} 817, and {Test} 815, which reference respectively the MEs illustrated in FIG. 8A with the corresponding names.

A variety of relationships 850, 852, 854, 858, 860 and 862 of differing types are also shown in FIG. 8B. In particular, in the illustrated example, relationships 850 and 852 are inheritance relationships such that relationship 852 indicates, for example, that the Person data structure is a superclass of the Employee data structure. Thus, each attribute of the Person data structure will also be included in the Employee data structure. Relationships 854, 858, 860, and 862 indicate a mutual inclusion relationship such that, for example, relationship 854 represents that the Employee data structure will include an attribute that can hold as a value 0 or more (indicated by the "0..*" modifier on the relationship) CourseSession instances. Similarly, relationship 854 also represents that the CourseSession data structure will include an attribute that can hold as a value a single (indicated by the "1" modifier on the relationship) Employee instances.

Figure 8C:
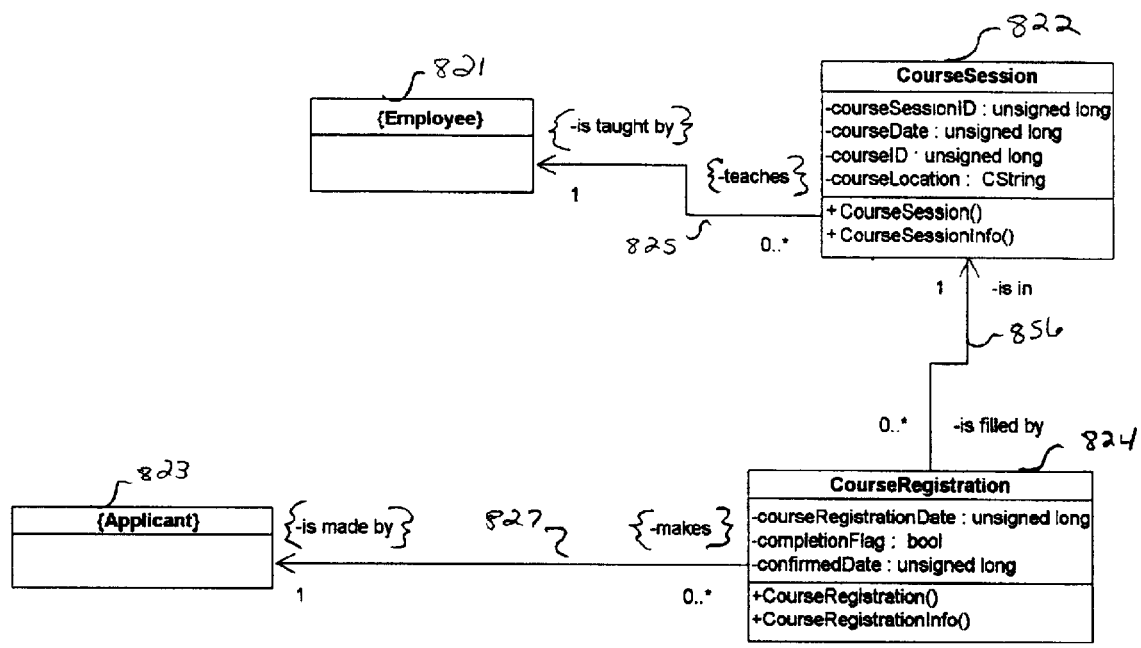

FIG. 8C illustrates a model segment that includes ME data structures related to courses, including CourseSession 822 and CourseRegistration 824. Each of these data structures include a variety of ME data attributes and method attributes as shown. As discussed above, the relationships between these data structures and the data structures used to represent people were defined in the model segment shown in FIG. 8B, and thus these relationships do not need to also be shown in FIG. 8C. However, in the illustrated embodiment each model segment shows the relationships to the data structures defined in that model segment. Since these relationships have already been defined, this model segment includes not only external MEs {Employees} 821 and {Applicant} 823, but also external relationships 825 and 827 referencing relationships 854 and 858 respectively. The model segment also defines the relationship 856 as shown between the CourseSession and CourseRegistration data structures.

Figure 8D:
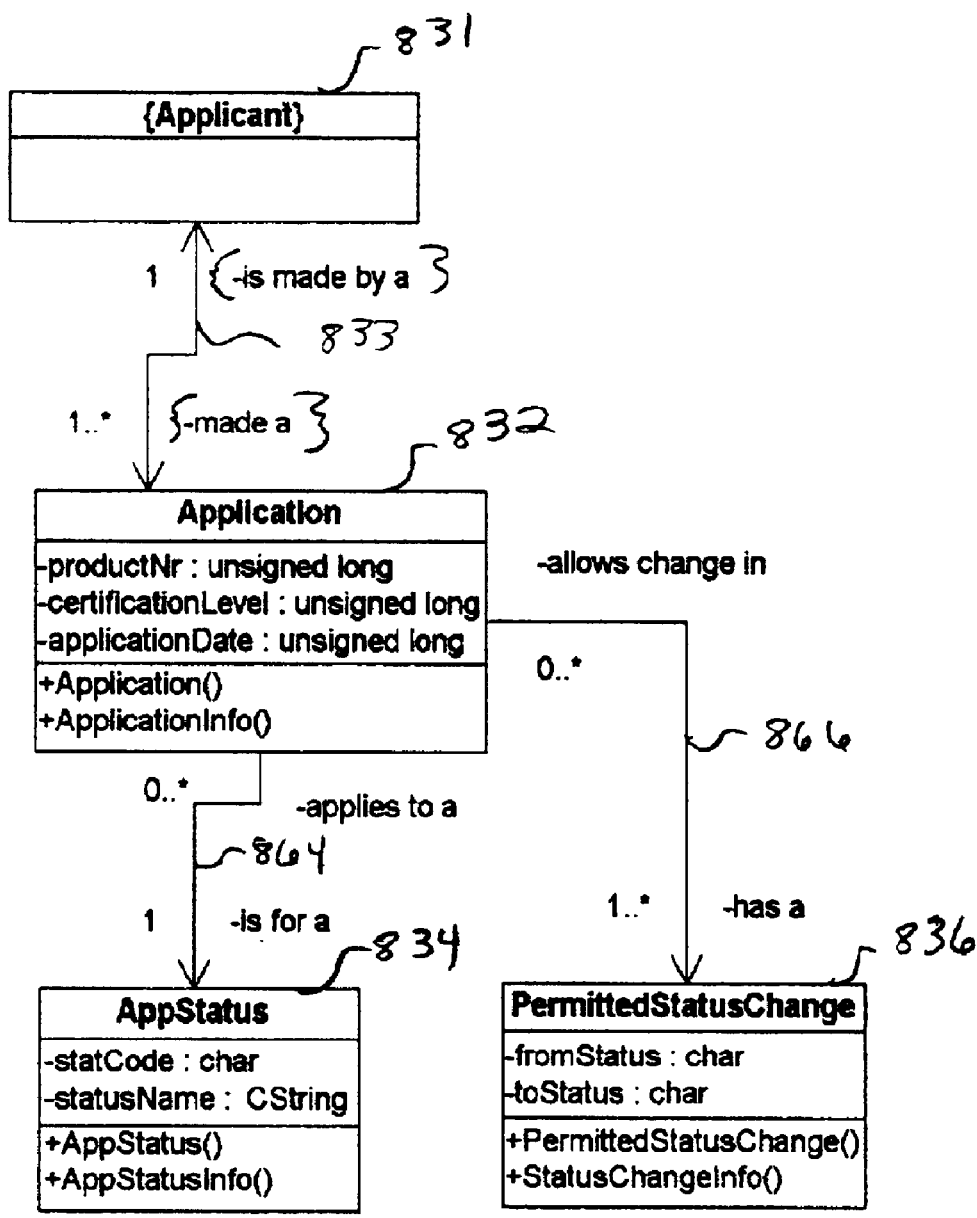

Similarly, FIG. 8D illustrates a model segment that includes ME data structures related to an applicant's application, including Application 832, AppStatus 834, and PermittedStatusChange 836. Each of these data structures include a variety of ME data attributes and method attributes as shown. As with FIG. 8C, the relationship 862 between the Application and Applicant data structures was defined in the model segment shown in FIG. 8B. Nonetheless, this model segment also includes external ME {Applicant} 831, and external relationship 833 that references relationship 862. This model segment also defines the relationships 864 and 866 between the Application data structure and the AppStatus and PermittedStatusChange data structures respectively.

Figure 8E:
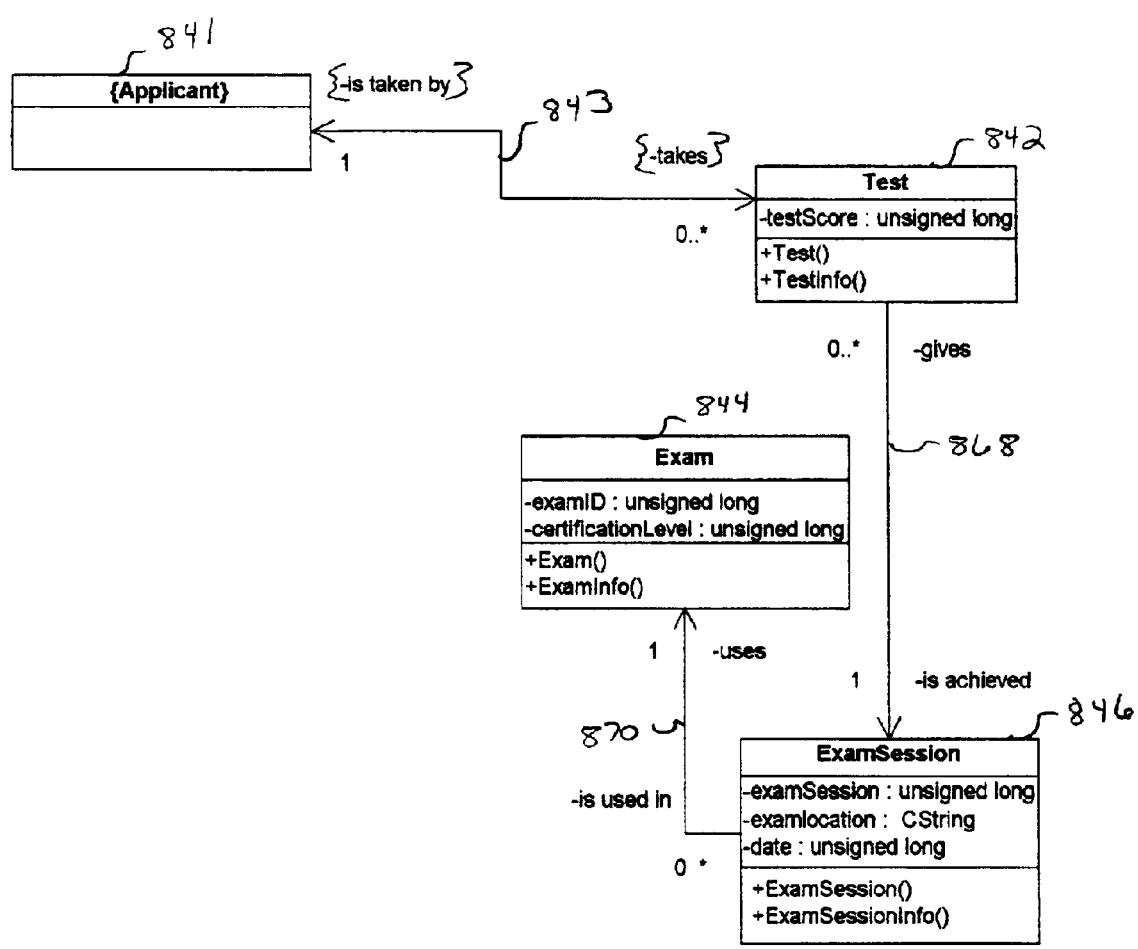

Finally, FIG. 8E illustrates a model segment that includes ME data structures related to tests and exams, including Test 842, Exam 844, and ExamSession 846. Each of these data structures include a variety of ME data attributes and method attributes as shown. This model segment also includes external ME {Applicant} 841, as well as external relationship 843 that references relationship 860. This model segment also defines the relationships 868 and 870 between the ExamSession data structure and the Test and Exam data structures respectively.

Through the combination and verification process described above, the model segments illustrated in FIGS. 8B–8E can be combined to form the complete model shown in FIG. 8A.

Those skilled in the art will appreciate that in some embodiments a variety of modifications from the above-described system can exist. For example, in some embodiments an external ME in a model segment can have a defined relationship in that model segment with another external ME in that model segment, while in other embodiments external MEs can be related only to non-external MEs. Similarly, in some embodiments external relationships can be defined in a model segment such that the definition or description of the relationship is located outside the model segment, while in other embodiments no external relationships may exist. Those skilled in the art will also appreciate that in some embodiments, MEs or relationships may be defined indirectly, such as a relationship between two MEs being defined indirectly by one or both of the MEs (e.g., by including one of those MEs as a value of an attribute of the other ME).

From the foregoing it will be appreciated that, although specific embodiment have been described herein for purposes of illustration, various modification may be made without deviating from the spirit and scope of the invention. According, the invention is not limited except as by the appended claims.

What is claimed is:

1. A computer system for assembling a complete model that includes model elements from different model segments, comprising:

a user input device able to receive an indication of a first model segment that contains a description of a first model element having a first structure, that contains a reference to a second model element whose description is contained in a second model segment and that has a second structure, and that contains an indication of a relationship between the first and second model elements that represents an alteration of at least one of the first and second structures; and a model creator able to create the complete model by retrieving the description of the second model element from the second model segment and replacing the reference to the second model element with the retrieved description.

2. The computer system of claim 1 wherein the model creator is further able to verify completeness of the complete model.

3. The computer system of claim 1 including a model segment creator able to, under control of a user, create a description of a first model element in a model segment, create in the model segment a reference to a second model element whose description is contained in another model segment, and create a relationship between the first model element and the reference.

4. The computer system of claim 3 wherein the model segment creator is further able to display to the user visual representations of the first model element, the reference, and the relationship.

5. A computer-readable medium whose contents cause a computer system to assemble a complete model that includes model elements from different model segments by performing the method comprising:

receiving an indication of a first model segment that contains a description of a first model element having a first structure, a reference to a second model element whose description is contained in a second model segment and that has a second structure, and an indication of a relationship between the first and second model elements that represents an alteration of at least one of the first and second structures; and creating the complete model by, retrieving the description of the second model element from the second model segment; and placing in the complete model the description of the first model element from the first model segment, the retrieved description from the segment model segment, and the indication of the relationship between the descriptions of the first and second model elements.

6. The computer-readable medium of claim 5 wherein the contents further cause the computer system to verify completeness of the complete model.

7. The computer-readable medium of claim 5 wherein the contents further cause the computer system to, under control of a user, create a description of a first model element in a model segment, create in the model segment a reference to a second model element whose description is contained in another model segment, and create an indication of a relationship between the first model element and the reference.

8. The computer-readable medium of claim 5 wherein the contents further cause the computer system to display to a user visual representations of the model elements, the reference, and the relationship.

9. A method embodied on a computer readable medium for creating a complete model by combining multiple model elements and model element relationships created in multiple model segments, comprising:

creating a first model element and a second model element in a first model segment;

creating a first relationship between the first model element and the second model element;

creating a third model element in a second model segment; creating an external first model element in the second model segment, the external first model element representing the first model element;

creating a second relationship between the external first model element and the third model element, and creating a complete model from the first and second model segments by, adding the first, second and third model elements and the first and second relationships to the complete model; and substituting the first model element for the external first model element in the complete model so that the second relationship reflects a relationship between the first model element and the third model element.

10. The method of claim 9 wherein each of the model elements have a visual representation that is presented to a user when the complete model is displayed.

11. The method of claim 9 wherein the first and second model segments are created by different users.

12. A method embodied on a computer readable medium for creating one of multiple model segments that are to be assembled into a complete model, the complete model including model elements from each of the multiple model elements, comprising:

receiving an indication of a first model element having a first structure;

receiving an indication of a reference to a second model element whose description is contained in another model segment and that has a second structure;

receiving an indication of a relationship between the first and second model elements that represents an alteration of at least one of the first and second structures; and creating the one model segment by, creating a description of the first model element in the one model segment; creating an indication of the reference in the one model segment; and creating an indication of the relationship in the one model segment, so that the description of the first model element in the one model segment can later be combined with the description of the second model element from the another model segment in a manner consistent with the indicated relationship.

13. The method of claim 12 wherein the model elements and the relationship each have a visual representation that is displayed to a user.

14. The method of claim 12 including:

creating the complete model by, retrieving the description of the second model element from the another model segment; and replacing the reference to the second model element with the retrieved description.

15. The method of claim 12 wherein the first model element is created by a first user, and wherein the second model element is created by a second user.

16. A method embodied on a computer readable medium for creating a complete model that when displayed includes visual representations of model elements from different model segments and of a relationship between the model elements, the method comprising:

receiving an indication of a first model segment that when displayed contains a visual representation of a first model element, a visual representation of a reference to a second model element whose primary visual representation is contained in a second model segment when displayed, and a visual representation of a relationship between the visual representations of the first model element and the reference; and creating the complete model by, retrieving from the first model segment indications of the visual representations of the first model element and the relationship;

retrieving from the second model segment an indication of the primary visual representation of the second model element; and replacing the indication of the visual representation of the reference with the retrieved indication of the primary visual representation, so that when the complete model is displayed, the visual representation of the relationship will indicate that the relationship exists between the visual representation of the first model element and the primary visual representation of the second model element.

17. The method of claim 16 wherein each of the model elements have a structure that is indicated by the visual representation for that model element.

18. The method of claim 17 wherein the relationship alters the visual representations of at least one of the model elements.

19. The method of claim 16 including creating the model elements and the relationship before the receiving of the indication.

20. The method of claim 16 wherein the first model element is created by a first user, and wherein the second model element is created by a second user.

21. A method embodied on a computer readable medium for assembling a complete model that includes model elements from different model segments, the method comprising:

for each of a plurality of model segments, for each model element indicated in the model segment;
determining whether the indicated model element is a reference to another model element defined in another model segment;
when the indicated model element is determined to be a reference to another model element, determining whether the another model element has been added to the complete model; and
when it is determined that the another model element has not yet been added, adding the indicated model element to the complete model; and
when the indicated model element is determined to not be a reference to another model element, adding the indicated model element to the complete model; and
for each reference to the indicated model element that exists in the complete model, replacing the reference with the added indicated model element, so that references to other model elements in the model segments are replaced in the complete model with the, other model elements.

22. The method of claim 21 including, before the adding of indicated model element to the complete model when the indicated model element is determined to not be a reference to an external model element:

determining whether the indicated model element has been added to the complete model; and
when it is determined that the indicated model element has been added to the complete model, signaling a multiple definition error for the indicated model element.

23. The method of claim 21 including:
after the adding of the indicated model elements to the complete model from each of the plurality of model segments, determining for each of the added indicated model elements whether the indicated model element is a reference to an external model element; and
when the indicated model element is determined to be a reference to an external model element, signaling an unresolved reference error far the indicated model element.

24. The method of claim 21 wherein each of the model elements have a visual representation that is presented to a user when the complete model is displayed.

25. The method of claim 21 including creating the model elements before the adding of the indicated model elements to the complete model from each of the plurality of model segments.

26. The method of claim 21 wherein the plurality of model segments are created by multiple users.

27. A method for creating a complete logical database model by combining related database elements defined in different model segments created by different users, each of the database elements representing a database table or a column of a database table, a remote database element in a different model segment represented in a current model segment by creating in the current model segment an external database element that represents the remote database element, the method comprising:

under control of a first user, creating a first database element in a first model segment;
under control of a second user, creating a second database element in a second model segment;
creating an external first database element in the second model segment, the external first database element representing the first database element;
displaying in the second model segment visual indications of the second and external first database elements; and
creating a relationship in the second model segment between the external first database element and the second database element by using the displayed visual indications; and
creating the complete logical database model by, adding to the complete logical database model the database elements from the first and second model segments;
substituting the first database element for the external first database element in the complete logical database model; and
creating the relationship in the complete logical database model between the second database element and the substituted first database element, so that the substitution of the first database element for the external first database element in the complete logical model modifies the relationship in the complete logical database model so that it exists between the first model element and the second model element.

28. The method of claim 27 including:
under the control of the first user, creating a third database element in the first model segment;
displaying visual indications of the first and third database element in the first model segment; and
creating a second relationship in the first model segment between the first database element and the third database element by using the displayed visual indications of the first and third database elements;
adding the third database element and the second relationship to the complete logical database model; and
maintaining in the complete logical database model the second relationship between the first and third database elements.

29. The method of claim 27 wherein the first and second database elements each represent a table, and wherein the relationship indicates that attributes of the tables are related.

30. The method of claim 27 wherein the first database element represents a table, wherein the second database element represents a attribute, and wherein the relationship indicates that the second database element is an attribute of the first database element.

31. The method of claim 27 wherein the second database element represents a table, wherein the first database element represents a attribute, and wherein the relationship indicates that the first database element is an attribute of the second database element.

32. The method of claim 27 wherein the complete logical database model is an Entity-Relationship diagram that is syntactically and semantically correct such that a relational database schema can be generated from the diagram.

33. The method of claim 32 wherein neither the first model segment nor the second model segment alone is syntactically and semantically correct such that a relational database schema can be generated from either of the model segments alone.

34. A method embodied on a computer readable medium for assembling a complete model that includes model elements from different model segments, the method comprising:

receiving an indication of a first model segment that contains a description of a first model element having a first structure, a reference to a second model element whose description is contained in a second model segment and that has a second structure, and an indication of a relationship between the first and second model elements that represents an alteration of at least one of the first and second structures; and creating the complete model by, retrieving the description of the second model element from the second model segment; and replacing the reference to the second model element with the retrieved description.

35. The method of claim 34 including, after the creating of the complete model, determining whether the indicated alteration of the model element structures produces a valid model.

36. The method of claim 34 wherein the replacing of the reference to the second model element with the retrieved description includes altering at least one of the first and second structures as indicated.

37. The method of claim 34 wherein the complete model is a database model specified using an Entity-Relationship format, and wherein at least one of the model elements represents a table.

38. The method of claim 34 wherein the complete model is a database model, and wherein at least one of the model elements represents an object.

39. The method of claim 34 wherein the complete model is a network model, and wherein at least one of the model elements represents a network node.

40. The method of claim 34 wherein the complete model is specified using a Unified Modeling Language format, and wherein at least one of the model elements represents an object.

41. The method of claim 34 wherein the complete model is specified using an Object-Role Modeling format.

42. The method of claim 34 wherein the second structure includes second model element attributes, and wherein the indicated alteration is to add the first model element as an attribute of the second model element.

43. The method of claim 34 wherein the first structure includes first model element attributes, and wherein the indicated alteration is to add the second model element as an attribute of the first model element.

44. The method of claim 34 wherein the first structure includes first model element attributes, wherein the second structure includes second model element attributes, and wherein the indicated alteration is to add the attributes of the first model element as attributes of the second model element.

45. The method of claim 34 wherein the first structure includes first model element attributes, wherein the second structure includes second model element attributes, and wherein the indicated alteration is to add the attributes of the second model element as attributes of the first model element.

46. The method of claim 34 wherein the model elements and the relationship each have a visual representation that are displayed to a user.

47. The method of claim 34 including creating the model elements and the relationship before the receiving of the indication.

48. The method of claim 34 wherein the first model element is created by a first user, and wherein the second model element is created by a second user.

49. The method of claim 34 wherein the first and second model segments are distinct files.

50. The method of claim 34 wherein at least one of the first and second model segments is part of a pre-defined library of model elements.

* * * * *